(12) United States Patent
Willis

(10) Patent No.: US 7,125,940 B2
(45) Date of Patent: Oct. 24, 2006

(54) CONJUGATED DIENE POLYMERS AND COPOLYMER BLOCKS AND PROCESS FOR PREPARING SAME

(75) Inventor: Carl L. Willis, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 241 days.

(21) Appl. No.: 10/741,535

(22) Filed: Dec. 19, 2003

(65) Prior Publication Data

US 2004/0167292 A1    Aug. 26, 2004

Related U.S. Application Data

(60) Provisional application No. 60/437,411, filed on Dec. 31, 2002.

(51) Int. Cl.
    *C08F 4/46* (2006.01)
(52) U.S. Cl. .............. 526/173; 526/174; 526/176; 526/177; 526/178; 526/181; 526/209
(58) Field of Classification Search ........ 526/173, 526/174, 176, 177, 178, 181, 209
    See application file for complete search history.

(56) References Cited

U.S. PATENT DOCUMENTS

| | | |
|---|---|---|
| 3,113,986 A | 12/1963 | Breslow et al. |
| 3,130,237 A | 4/1964 | Wald |
| 3,205,218 A | 9/1965 | Arbuckle et al. |
| 3,595,942 A | 7/1971 | Wald et al. |
| 3,830,880 A | 8/1974 | De LaMare |
| 4,172,100 A | 10/1979 | Tung et al. |
| 4,182,818 A | 1/1980 | Tung et al. |
| 4,196,153 A | 4/1980 | Tung et al. |
| 4,196,154 A | 4/1980 | Tung et al. |
| 4,429,090 A | 1/1984 | Hall |
| 5,795,944 A | 8/1998 | Graafland et al. |
| 6,103,846 A * | 8/2000 | Willis et al. ............. 526/335 |
| 6,391,981 B1 | 5/2002 | Willis et al. |
| 6,455,651 B1 | 9/2002 | Goodwin et al. |
| 2004/0054090 A1 | 3/2004 | Bening et al. |

FOREIGN PATENT DOCUMENTS

EP    0 387 947    9/1994

* cited by examiner

*Primary Examiner*—Bernard Lipman

(57) ABSTRACT

Disclosed is a process for preparing polymers and copolymer blocks of conjugated dienes with varying amounts of branching comprising the use of a microstructure control agent and a microstructure control agent deactivant. The polymerization can be started with or without a microstructure control agent. At some point in the polymerization prior to the completion of the addition of the conjugated diene to the polymer, the microstructure control agent can be deactivated, either partially or completely, resulting in a polymer or copolymer block having a region of less branching adjacent to a region of more branching. Preferred microstructure control agent deactivants are metal alkyls such as triethyl aluminum.

16 Claims, No Drawings

CONJUGATED DIENE POLYMERS AND COPOLYMER BLOCKS AND PROCESS FOR PREPARING SAME

CROSS-REFERENCE TO RELATED APPLICATIONS

This application claims priority from U.S. Provisional Patent Application 60/437,411, filed Dec. 31, 2002.

BACKGROUND OF THE INVENTION

1. Field of the Invention

The present invention relates to conjugated diene polymers and conjugated diene copolymer blocks, and a process for preparing them. The present invention particularly relates to butadiene and styrenic block copolymers and a process for preparing them.

2. Background of the Art

The preparation of conjugated diene polymers, particularly in the form of block copolymers based upon more than one monomer, is well known. In a synthetic process, an initiator compound is used to start the polymerization of one monomer. The reaction is allowed to proceed until all of the monomer is consumed resulting in a living homopolymer. To this living homopolymer is added a second monomer that is chemically different from the first. The living end of the first polymer serves as the site for continued polymerization, thereby incorporating the second monomer as a distinct block into the linear polymer. The block polymer so grown is living until terminated.

Butadiene and styrene are often used to prepare such polymers. The most common of these are styrene and butadiene diblock copolymers and triblock copolymers having a butadiene based midblock with styrene endblocks. In some instances, coupling agents can also be used to couple still living polymers to prepare higher molecular weight polymers. In the production of the most common triblock copolymers, after the butadiene midblock is prepared, additional styrene is then added to the molecule to form a styrene endblock. These polymers are often referred to as SBS copolymers. Such polymers are often sold with retained unsaturation, but hydrogenated forms wherein some or all of the unsaturation has been eliminated are also available.

Microstructure control of conjugated diene polymers or conjugated diene copolymer blocks within block copolymers can be important because a controlled degree of branching in the polymer can be desirable. In the case of butadiene, if the polybutadiene or polybutadiene block is all straight chain, such as in 1,4-polybutadiene, then when the polymer is hydrogenated it will have a polyethylene-like structure and have the corresponding crystallinity associated with such a structure. If the polybutadiene or polybutadiene block is branched, such as in 1,2-polybutadiene, the crystallinity will be lessened or eliminated, which can introduce thermoplastic and elastomeric properties into the polymer.

Microstructure control may be used to prepare a block copolymer based upon only a single monomer. The blocks in such a copolymer differ only in the nature of the addition of the monomer species. This type of block copolymer has been prepared from diene monomers using anionic polymerization techniques. If the diene monomer is butadiene, the first block might be prepared without the addition of a microstructure control agent which would afford a segment which is predominately the result of 1,4-addition of butadiene. A microstructure control agent could be added to the living polymer at that point and additional butadiene added. Polymerization of a second block of butadiene would ensue which would be higher in 1,2-addition of butadiene. The 1,2-addition of butadiene is often referred to as vinyl addition as the product introduces a vinyl group pendant to the polymer backbone. A two-block copolymer prepared in this way would have blocks derived from butadiene that differ only in vinyl content.

The glass transition temperature ($T_g$) of conjugated diene polymers is also affected by microstructure control. The more 1,4-polybutadiene structure present, the lower the resulting $T_g$ of the butadiene segments and the lower the service temperature of the polymer. Microstructure can also affect melt compatibility with polyolefins such as polypropylene and polyethylene.

Particularly for SBS thermoplastics, it is desirable that the microstructure of the block copolymer includes at least some degree of branching or vinyl content in the polybutadiene midblocks. The resulting block copolymers can then have the desired thermoplastic and elastomeric properties, such as lower glass transition temperature, usually designated using the symbol $T_g$, and hardness. This is known in the art and it is disclosed in references such as U.S. Pat. No. 5,795,944 to Graafland, et al. Therein, it is disclosed to use a microstructure control agent in two or more doses to closely control the vinyl content of a polymer, in some cases even varying the vinyl content within different regions within the midblock. Block copolymers having specific microstructures can also be prepared by coupling as is shown in EP 0 387 947 B1 to Van der Huizen, et al.

It would be desirable in the art of preparing conjugated diene polymers and conjugated diene copolymer blocks to prepare the polymers or copolymer blocks with both higher and lower amounts of branching as compared to conventional microstructure control technology.

SUMMARY OF THE INVENTION

In one aspect, the present invention is a process for preparing a conjugated diene polymer or copolymer block having a varying amount of branching comprising combining: (a) an anionic polymerization site; (b) a conjugated diene monomer; and (c) a microstructure control agent; under reaction conditions sufficient to form a living polymer admixture and, at a point in the process prior to the completion of the addition of the conjugated diene monomer, combining the living polymer admixture with a microstructure control agent deactivant to mitigate or eliminate the effect of the microstructure control agent.

In another aspect, the present invention is a polymer or copolymer block prepared using a process for preparing a conjugated diene polymer or copolymer block having a varying amount of branching comprising combining: (a) an anionic polymerization site; (b) a conjugated diene monomer; and (c) a microstructure control agent; under reaction conditions sufficient to form a living polymer admixture and, at a point in the process prior to the completion of the addition of the conjugated diene monomer, combining the living polymer admixture with a microstructure control agent deactivant to mitigate or eliminate the effect of the microstructure control agent.

In still another aspect, the present invention is a composition of matter comprising a conjugated diene polymer prepared by the anionic polymerization of a conjugated diene monomer, the polymer having a general structure:

$B^1$-$B^2$-$B^3$ wherein: $B^1$ represents a region of the polymer prepared in the absence of a microstructure control agent, $B^2$ represents a region of the polymer prepared in the presence of a microstructure control agent, and $B^3$ represent a region of the polymer prepared in the presence of a microstructure control agent and a microstructure control agent deactivant.

Another aspect of the present invention is a composition of matter comprising a conjugated diene block copolymer prepared by the anionic polymerization of a conjugated diene monomer, the polymer having the general structure:

$$B^1\text{-}B^2\text{-}B^3$$

wherein $B^1$ represents a diene polymer block having a vinyl content of from about 3 to about 50 mole percent, $B^2$ represents a diene polymer block having a vinyl content at least 10% greater than the vinyl content of $B^1$, and $B^3$ represents a diene polymer block having a vinyl content greater than $B^1$ but less than $B^2$.

DETAILED DESCRIPTION OF THE PREFERRED EMBODIMENTS

The present invention is, in a preferred embodiment, a conjugated diene polymer or conjugated diene copolymer block. The conjugated diene polymers or copolymer blocks of the present invention can be linear or radial and prepared with or without coupling agents. In a preferred embodiment, the invention is a copolymer block such as in a styrene-butadiene-styrene copolymer wherein the butadiene midblock is prepared using the process of the present invention. The invention includes both hydrogenated and unhydrogenated forms of the copolymer.

While the present invention includes conjugated diene polymers, a preferred embodiment is a copolymer having a conjugated diene polymer of the present invention as a block incorporated within the block copolymer. The linear form of the block copolymers of the present invention have a general formula AB wherein B is a copolymer block prepared using a conjugated diene and the process of the present invention. A is a block prepared using a different monomer such as, for example, styrene.

The radial form of the block copolymers of the present invention have a general formula $(AB)_nX$. For example when the block copolymer is is prepared from a vinyl aromatic monomer and a conjugated diene monomer, A stands for a vinyl aromatic copolymer block; B stands for a conjugated diene copolymer block; X stands for the residue of a coupling agent; and n is more than 1, preferably from 2 to 40, more preferably from 2 to 5, most preferably from 2 to 4.

The block copolymers of the present invention may have a tapered block structure. In tapered block copolymers, each block should contain predominantly only one component, A or B. In each block, the presence of the non-predominant or minor component is preferably less than 50 weight percent, more preferably less than 20 weight percent. Most preferably each block contains only one or essentially only one component, i.e. A or B.

The conjugated diene polymers or block copolymers of the present invention are prepared using solution anionic polymerization techniques. Using this process, the polymer or block copolymers of the present invention are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as lithium or sodium or potassium) compound in a suitable solvent at a temperature within the range from about 10° C. to about 150° C., preferably at a temperature within the range from about 30° C. to about 120° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4. The organolithium initiators are preferred for polymerization at higher temperatures because of their increased stability at elevated temperatures.

While the monofunctional initiators are preferred for use with the present invention, other multifunctional initiators, particularly as minor amounts in admixture with monofunctional initiators can be used. There are many multifunctional initiators that can be used herein. The di-sec-butyl lithium adduct of m-diisopropenylbenzene is preferred because of the relatively low cost of the reagents involved and the relative ease of preparation. 1,1-Diphenylethylene, styrene, butadiene, and isoprene will all work to form dilithium (or disodium) initiators upon contact with the zero valence metal. Still another compound that will form a di-initiator with an organo alkali metal such as lithium and will work in the process of the present invention is the adduct derived from the reaction of 1,3-bis(1-phenylethenyl)benzene (DDPE) with two equivalents of a lithium alkyl.

Related adducts which are also known to give effective dilithium initiators are derived from the 1,4-isomer of DDPE. In a similar way, it is known to make analogs of the DDPE species having alkyl substituents on the aromatic rings to enhance solubility of the lithium adducts. Related families of products which also make good dilithium initiators are derived from bis[4-(1-phenylethenyl)phenyl]ether, 4,4'-bis(1-phenylethenyl)-1,1'-biphenyl, and 2,2'-bis[4-(1-phenylethenyl)phenyl]propane. For example, see L. H. Tung and G. Y. S. Lo, Macromolecules, 1994, 27, 1680–1684 (1994) and U.S. Pat. Nos. 4,172,100, 4,196,154, 4,182,818, and 4,196,153. Suitable lithium alkyls for making these dilithium initiators include the commercially available reagents, such as sec-butyl and n-butyl lithium, as well as anionic prepolymers of these reagents, polystyryl lithium, polybutadienyl lithium, polyisopreneyl lithium, and the like.

Conjugated dienes that are useful with the present invention and which can be polymerized anionically include those conjugated diolefins containing from 4 to about 12 carbon atoms such as 1,3-butadiene, isoprene, piperylene, methylpentadiene, 1,3-cyclohexadiene, 1,3-cycloheptadiene, 1,3-cyclooctadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, α-methylstyrene, 2-vinylpyridine, 4-vinylpyridine, vinylnaphthalene, alkyl-substituted vinylnaphthalenes and the like. Mixtures of these may be used. Preferably, the conjugated diene is 1,3-butadiene.

When the present invention is a conjugated diene polymer, the conjugated diene monomer is contacted with the anionic polymerization initiator to first form an anionic polymerization site. Polymerization occurs at this site as it comes into contact with additional monomer molecules. If the present invention is a block copolymer and the first blocks prepared are the conjugated diene copolymer blocks, then the living polymer serves as the site for continued polymerization.

When the present invention is a block polymer, but the conjugated diene copolymer blocks are not the first blocks formed, a first monomer, different from the conjugated diene monomer or monomers is polymerized as set out above, and this block serves as the anionic polymerization site for the continued polymerization incorporating the conjugated diene monomers as a distinct block into the linear polymer. In any of these embodiments, the block copolymer so grown is living until terminated.

The polymerization of the process of the present invention is carried out, preferably at a temperature of 30° C. to 120° C. in a hydrocarbon solvent. Suitable solvents include straight and branched chain hydrocarbons such as pentane, hexane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; and mixtures thereof.

In the practice of the process of the present invention for polymerizing a conjugated diene, at a point in the process prior to the completion of the addition of the conjugated diene monomer to a living polymer admixture, a microstructure control agent is added to the living polymer admixture. The desired level of vinyl content is achieved by properly selecting the type and the amount of these microstructure control agents, which are commonly Lewis basic compounds. Such compounds include ether compounds and tertiary amines. Examples include cyclic ethers such as tetrahydrofuran, tetrahydropyran and 1,4-dioxane; aliphatic, acyclic monoethers such as diethyl ether, dimethyl ether and dibutyl ether; aliphatic polyethers such as ethylene glycol dimethyl ether, ethylene glycol diethyl ether, ethylene glycol dibutyl ether, diethylene glycol diethyl ether and diethylene glycol dibutyl ether; 1,2-diethoxy propane; aromatic ethers such as diphenyl ether, o-dimethoxy benzene, and anisole; tertiary amine compounds such as triethylamine, tripropylamine, tributylamine; and other compounds such as N,N,N',N'-tetramethylethylenediamine, N,N-diethylaniline, pyridine and quinoline.

Many of these microstructure control agents are temperature sensitive, producing varying amounts of vinyl content in the diene polymer at different temperatures. Thus, if a constant vinyl content is required in the polymer, the polymerization must be carried out isothermally or additional microstructural control agent must be added as the polymerization temperature is increased. Diethyl ether is often used because it is not as temperature sensitive as the others and does not require isothermal operation. Diethyl ether, however, has disadvantages. It is not as effective in producing vinyl content as other ethers and larger amounts of it have to be used. In fact, the larger amounts that are necessary require that, when polymerization is complete and the polymer has been recovered from the solvent, the ether be separated from the main solvent, such as cyclohexane, and recovered so as to maintain a cost effective polymerization process. Separation of the diethyl ether is an additional step that increases the cost since it has to be purified and stored for reuse.

While the present invention can be practiced with any of the microstructure control agents, the heavy ethers are particularly preferred. Exemplary compounds include:
1,2-diethoxyethane
1,2-diethoxypropane
o-dimethoxybenzene
n-$C_4H_9OCH_2CH_2O$-n-$C_4H_9$
n-$C_4H_9OCH_2CH_2OCH_2OCH_3$
n-$C_4H_9OCH_2CH_2OCHCH_3OCH_2CH_3$
n-$C_4H_9OCH_2CH_2O$-t-$C_4H_9$
n-$C_4H_9OCH_2CH_2OCHCH_3$—O-i-$C_4H_9$ The diethers are more efficient microstructure control agents and can be used in smaller amounts than diethyl ether and thus, do not require recovery, which can make the overall polymerization process less expensive to operate. Combinations of any of these Lewis bases can also be used.

In the practice of the present invention, it is preferred that from 10 ppm to 1000 ppm of a heavy ether microstructure control agent be used to achieve the desired branching in the conjugated diene polymer or copolymer block of the present invention. It is more preferred that heavy ethers be used as the microstructure control agent. The microstructure control agent may be split equally between the different doses of the agent which are added to the polymerization mix or varying amounts may be added at various points as required or it may be added continuously.

When a microstructure control agent is used in the amounts indicated above in a polymerization process such as that of the present invention, the resulting polymer or copolymer block can have substantially more branching than the polymer or copolymer block would have if prepared in the absence of the microstructure control agent. For example, when butadiene is used in an anionic polymerization process without a microstructure control agent, the amount of branching observed is usually from about 5 to about 10 percent of the monomer units. The percent branching represents the portion of the polymer or copolymer block that has the general formula (showing the product of the polymerization of two butadiene unites):

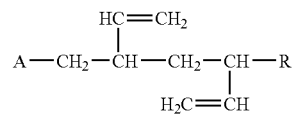

wherein A is a copolymer block or hydrogen and R is an anionic polymerization site, a copolymer block, or hydrogen. This structure represents the reaction product of two 1,2-additions. In the absence of a microstructure control agent, the predominantly unbranched polymer or copolymer block has a general structure:

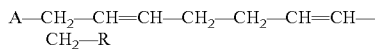

wherein A is a copolymer block or hydrogen and R is an anionic polymerization site, a copolymer block, or hydrogen. This structure represents the product of a 1,4-addition for two butadiene units. This second conformation is substantially less branched and, when hydrogenated more crystalline than the first while the saturated version first structure is more elastic.

In the anionic polymerization process described above, an admixture of living polymer chains, microstructure control agent, solvent, byproducts, and the like, hereinafter referred to as a polymer cement, is produced. In one embodiment, the present invention is a process for preparing a conjugated diene polymer or copolymer block having a varying amount of branching comprising combining: (a) an anionic polymerization site; (b) a conjugated diene monomer; and (c) a microstructure control agent; under reaction conditions sufficient to form a living polymer admixture and, at a point in the process prior to the completion of the addition of the conjugated diene monomer, combining the living polymer admixture with a microstructure control agent deactivant to mitigate or eliminate the effect of the microstructure control agent. The microstructure control agent deactivant is preferably a metal alkyl.

In the practice of the process of the present invention, it is preferred that the alkyl groups of the metal alkyl microstructure control agent deactivant compound are chosen so that they will not exchange with the living polymer chain ends. To this end, the metal alkyl compound is selected from the group consisting of aluminum, zinc and magnesium alkyls having from 1 to 20 carbon atoms per alkyl substituent and mixtures thereof. Preferably, the metal alkyl is selected from the group consisting of trialkyl aluminum, dialkyl magnesium, and dialkyl zinc compounds. Preferred trialkylaluminum compounds are triethylaluminum, trimethylaluminum, tri-n-propylaluminum, tri-n-butylaluminum, triisobutylaluminum, tri-n-hexylaluminum, and trioctylaluminum. Triethylaluminum is most preferred. Preferred dialkylmagnesium compounds are butylethylmagnesium, di-n-butylmagnesium, and di-n-hexylmagnesium. Preferred dialkylzinc compounds are dimethylzinc, diethylzinc, di-n-propylzinc, diisobutylzinc, and di-n-butylzinc.

The use of these materials in the manufacture of block copolymers is the subject of U.S. Pat. No. 6,391,981 to Willis, et al. Therein, it is disclosed that use of such materials can significantly reduce the viscosity of polymer cements formed therewith. Such a reduction in viscosity in the polymer cements can offer advantages in manufacturing. The use of these materials is also the subject of U.S. Provisional Patent Application No. 60/395,139, filed Jul. 11, 2002, which relates to certain improvements in the coupling efficiency and properties of coupled block copolymers prepared using these metal alkyl materials.

The amount of microstructure control agent deactivant to be added in the process of the present invention varies with the extent of the desired reduction in effectiveness of the microstructure control agent. It has been observed that a molar ratio of about 1:1 of microstructure control agent deactivant to microstructure control agent results in rendering the microstructure control agent only about 50% effective when the microstructure control agent is 1,2-dimethoxy propane and the microstructure control agent deactivant is triethyl aluminum, in an butadiene polymerization process. The interaction of the microstructure control agent deactivant with the microstructure control agent likely is a reversible reaction which makes the deactivation process equilibrium controlled. There is not a simple stoichiometric relationship between microstructure control agent and deactivant that can be used to quantitatively determine the degree to which microstructure will be affected. The quantitative affect of the deactivant can be measured experimentally. The maximum efficiency of the deactivant will be realized when the equivalent ratio of the the deactivant to microstructure control agent is less than or equal to 1. For reasons of economy, an equivalent ratio of the the deactivant to microstructure control agent greater than 10 is not preferred.

The microstructure control agent deactivant of the present invention is preferably added to the above described cement, prior to completion of the polymerization of the conjugated butadiene, at a concentration of from about 0.1 to about 10.0 equivalents of microstructure control agent deactivant per equivalent of microstructure control agent. More preferably, the equivalent ratio of microstructure control agent deactivant to microstructure control agent is from about 0.5:1 to about 2:1. Most preferably this ratio is about 1:1 when efficient use of the microstructure control agent deactivant is desired.

The microstructure control agent deactivants of the present invention can be added at different points during the addition of the conjugated diene monomer during the process of the present invention. For example, if it is desired to have an initial, more elastic region in the polymer or copolymer block, the reaction can be initiated and polymerization begun with the microstructure control agent in place and the microstructure control agent deactivant not added until about 50 percent of the monomer has been added and incorporated into the living polymer. This can also be done at 25 percent of the monomer addition and 75 percent of the monomer addition and at any point except for 0 percent and 100 percent of the monomer addition.

Building upon this idea, in the practice of the process of the present invention, unique materials can be prepared. In a preferred embodiment, the present invention is a composition of matter comprising a conjugated diene polymer prepared by the anionic polymerization of a conjugated diene monomer, the polymer having a general structure:

wherein: $B^1$ represents a region of the polymer prepared in the absence of a microstructure control agent, $B^2$ represents a region of the polymer prepared in the presence of a microstructure control agent, and $B^3$ represents a region of the polymer prepared in the presence of a microstructure control agent and a microstructure control agent deactivant. For example, such a material could be prepared using the process of the present invention wherein a conjugated diene polymer or copolymer block is prepared in three steps: first with no microstructure control agent, then with microstructure control agent, and finally with microstructure control agent deactivant. The resultant conjugated diene polymer or copolymer block has a first region of relatively low branching or, if hydrogenated, high crystallinity, a second region of relatively high branching and a third region of relatively low branching. In the practice of the present invention, this embodiment can be prepared without using a coupling agent and thus there would be no coupling agent residue between the blocks.

When prepared as copolymer and using a coupling agent, a block copolymer of the present invention could have a structure:

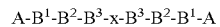

wherein: $B^1$ represents a region of the polymer prepared in the absence of a microstructure control agent, $B^2$ represents a region of the polymer prepared in the presence of a microstructure control agent, $B^3$ represent a region of the polymer prepared in the presence of a microstructure control agent and a microstructure control agent deactivant, and A is a block prepared using a different monomer such as, for example, styrene, and x is the residue of a coupling agent. In an alternative embodiment, the microstructure control agent is added near or at the beginning of the polymerization and the microstructure control agent deactivant is added near the end of the polymerization. Similarly either the microstructure control agent or the microstructure control agent deactivant can be added in more than one dose to vary the branching of the conjugated diene block to an even greater degree.

In a preferred embodiment, the present invention is a block copolymer prepared using a conjugated diene and preferably a vinyl aromatic compound. Suitable vinyl aromatic compounds useful with the process of the present invention include those having from 8 to 20 carbon atoms and include styrene, o-methylstyrene, p-methylstyrene, p-tert-butylstyrene, 2,4-dimethylstyrene, α-methylstyrene, vinylnaphthalene, vinyltoluene, vinylxylene, and mixtures thereof. Preferred monovinyl aromatic compounds are styrene, alpha-methylstyrene and para-methylstyrene, styrene being the most preferred. For the purposes of the present invention, a styrenic block copolymer is any block copolymer polymer prepared with a suitable vinyl aromatic compound.

When in the form of a block copolymer, the present invention is a styrenic block copolymer. This notwithstanding, the process of the present invention can be used to prepare any form of block copolymer known to be useful to those of ordinary skill in the art of preparing such block copolymers. For example, the conjugated dienes can be polymerized with a non-styrenic second monomer. The use of more than a single conjugated diene monomer to produce a block copolymer having more than a single type of block derived from a conjugated diene is also within the scope of the present invention.

The block copolymers of the present invention can be diblocks, triblocks, or even prepared having 3 or more distinct types of blocks with the copolymer. They can be prepared using coupling agents or not. The molecular weight will vary with the intended use of the block copolymer. For example, when coupled, the total average molecular weight of the coupled styrenic block copolymer of the present invention is preferably within the range of from about 2,000 to about 300,000 daltons. More preferably, the number average molecular weight is from about 3,000 to about 150,000 daltons, and most preferably, from about 30,000 to 100,000 daltons.

The number average molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of other (block) polymers is expressed as styrene equivalent molecular weight. Optionally, the styrene equivalent molecular weight may be converted to true molecular weight when the styrene content of the polymer and the vinyl content of the diene segments are known. The detector used is preferably a combination ultraviolet and refractive index detector.

The block copolymers of the present invention can be used in any application wherein such polymers are useful. For example, the block copolymers of the present invention are particularly useful as additives for bitumens in road and roofing use and as adhesives and additives for adhesives. They can be used alone and in combination with other polymers such as polyethylene, polypropylene, and polystyrene for the production of molded and extruded products such as footwear and film wraps. The polymers of the present invention can also foamed to produce lower in density foam products.

The presence of olefinic double bonds in polymers makes them susceptible to oxygen attack and to deterioration by actinic radiation; saturation of olefinic double bonds greatly improves environmental stability and may improve color. Therefore, after preparation, the branched polymers and block copolymers of the present invention can be hydrogenated. Such hydrogenation can be accomplished using any of the processes known by those of ordinary skill in the art to be useful. For example, U.S. Pat. No. 3,130,237, suggests hydrogenating unsaturated compounds by the use of certain cobalt complexes. U.S. Pat. No. 3,205,218 teaches hydrogenation of olefinic compounds utilizing a complex of a nickel or cobalt compound with certain aluminum reactants. U.S. Pat. No. 3,113,986 is related and suggests hydrogenation in the presence of the reaction products of certain metal alkoxides with aluminum trialkyls. U.S. Pat. No. 3,595,942 teaches selective hydrogenation of block copolymers with reaction products of aluminum trialkyls and metal alkoxides or carboxylates. The hydrogenation will preferably be a selective hydrogenation wherein aromatic unsaturation is not hydrogenated.

The polymers of the present invention may also, optionally, contain various additives, such as antioxidants, flow promoters, dusting agents, processing oils, ultraviolet absorbers, light stabilizers or coloring agents. Preferably the amount of these additives present in the polymer composition is not more than 5 weight parts per 100 weight parts of block copolymer.

EXAMPLES

The following examples are provided to illustrate the present invention. The examples are not intended to limit the scope of the present invention and they should not be so interpreted. Amounts are in weight parts or weight percentages unless otherwise indicated.

Example 1

1780 grams (g) of cyclohexane are charged into a 1 gallon (3.8 liter (L)) stainless steel autoclave equipped with a water circulation jacket. 200 g of butadiene and 1.37 g of 1,2-diethoxy propane in 10 g cyclohexane; 4.9 g of a 25 percent solution of triethyl aluminum in hexane are then charged to the autoclave and the temperature maintained at about 40° C. 13.0 g of a 10 percent solution of sec-butyl lithium solution in cyclohexane is then added to the autoclave. The temperature of the autoclave was maintained at about 40° C. for 180 minutes. 4 milliliters (ml) of methanol is added at the end of the polymerization period to terminate the polymerization. A sample of the resultant polymer has a vinyl content as determined by $^1$H NMR of 40.9 percent.

Comparative Example I 1681 g of cyclohexane are charged into a 1 gallon (3.8 L) stainless steel autoclave equipped with a water circulation jacket. 200 g of butadiene are then charged to the autoclave and the temperature maintained at about 40° C. 99.35 g of a solution of pre-formed dilithium initiator, 0.9N in lithium content, made from the reaction of diisopropenyl benzene with sec-butyllithium in the presence of diethyl ether are charged into the autoclave. Sufficient diethyl ether is charged to the autoclave to bring the diethyl ether concentration to 0.45 percent. The temperature of the autoclave was maintained at 40° C. for 180 minutes. A sample of the resultant polymer has a vinyl content as determined by $^1$H NMR of 23.6 percent.

Comparative Example II 1563 g of cyclohexane are charged into a 1 gallon (3.8 liter (L)) stainless steel autoclave equipped with a water circulation jacket. 200 g of butadiene; 0.4 g of 1,2-diethoxy propane in 20 g cyclohexane; and 120 g diethyl ether are then charged to the autoclave and the temperature maintained at about 40° C. 92.7 g of a solution of pre-formed dilithium initiator, 1.05N in lithium content, made from the reaction of diisopropenyl benzene with sec-butyllithium in the presence of diethyl ether are charged into the autoclave. Sufficient diethyl ether is charged to the autoclave to bring the diethyl ether concentration to 6.5 percent. The temperature of the autoclave was maintained at 40° C. for 40 minutes. A sample of the resultant polymer has a vinyl content as determined by $^1$H NMR of 49.6 percent.

Example 2

The method of Comparative Example II is repeated substantially identically except that: 1386 g instead of 1563 g of cyclohexane; 28.07 g instead of 0 g of a 25% solution of triethyl aluminum (TEA) in hexane and 232 g of a solution of pre-formed dilithium initiator, 0.42N in lithium content, made from the reaction of diisopropenyl benzene with sec-butyllithium in the presence of diethyl ether instead of 92.7 g of a solution of pre-formed dilithium initiator, 1.05N in lithium content, made from the reaction of diisopropenyl benzene with sec-butyllithium in the presence of diethyl ether are used to prepare the polymer and the polymerization period is 95 minutes instead of 40 minutes. A sample of the resultant polymer has a vinyl content as determined by $^1$H NMR of 41.7 percent.

Comparative Example III 1895 g of cyclohexane are charged into a 1 gallon (3.8 liter (L)) stainless steel autoclave equipped with a water circulation jacket. 100 g of butadiene are then charged to the autoclave and the temperature maintained at about 40° C. 6.4 g of an 11 percent sec-butyl lithium solution in cyclohexane is charged into the autoclave. The temperature of the autoclave was maintained at 40° C. for 420 minutes. At the end of the polymerization period 4 ml of methanol is added to the autoclave to terminate the polymerization. A sample of the resultant polymer has a vinyl content as determined by $^1$H NMR of 14.2 percent.

Comparative Example IV

The method of Comparative Example III is repeated substantially identically except that: 1785 g instead of 1895 g of cyclohexane; 200 g instead of 100 g of butadiene; 1.32 grams instead of 0 g of 1,2-diethoxypropane in about 10 grams of cyclohexane; and 13.31 grams of a 10% wt. sec-butyllithium solution in cyclohexane instead of 6.4 g of an 11 percent sec-butyl lithium solution in cyclohexane are used to prepare the polymer and the polymerization period is 96 minutes instead of 420 minutes. A sample of the resultant polymer has a vinyl content as determined by $^1$H NMR of 73.2 percent.

The Examples show that the use of a combination of an efficient microstructure control agent and a microstructure control agent deactivant during a polymerization produces a polymer having an intermediate amount of vinyl content whereas a similar polymerization occurring with neither material, such as in Comparative Example III or with the microstructure control agent deactivant alone, such as in Comparative Example I, results in a polymer having a very low amount vinyl content. A polymer produced in the presence of a significant amount of microstructure control agent, such as in Comparative Example IV has a very high vinyl content.

Example 3

A conjugated diene polymer of the present invention having a general structure: B1-B2-B3 is prepared wherein: B1 represents a region of the polymer prepared in the absence of a microstructure control agent, B2 represents a region of the polymer prepared in the presence of a microstructure control agent, diethoxypropane (DEP), and B3 represents a region of the polymer prepared in the presence of DEP, a microstructure control agent, and a microstructure control agent deactivant, TEA.

13.13 g of a 10% wt solution of s—BuLi (20 mmol) in cyclohexane is added to an autoclave under nitrogen pressure containing 100 g of butadiene in 1680 g of polymerization grade cyclohexane. Polymerization at 40° C. proceeds until the butadiene is consumed (240 min), forming a living Step I polymer cement.

An aliquot of about 10 ml of the living Step I polymer cement is removed from the reactor and terminated by the addition of a small amount of methanol. The polymer concentration, also referred to as solids level in this analytical sample, is found by evaporation of the solvent to be 5.09% wt. An $^1$H NMR analysis of this sample, B1, shows that the vinyl content, also referred to as the 1,2-addition of butadiene content of the polymer, is 7.4% wt.

The living polymer cement from Step I of the polymerization is treated with 1.35 g of DEP, a microstructure control agent. About 100 g of butadiene (100 g) is charged to the reactor and the ensuing polymerization under the same conditions results in polymer segment B2.

When the second step of the polymerization is complete after about 177 min, a small aliquot of the polymer cement is removed from the reactor and terminated by the addition of methanol. The concentration of polymer in this analytical sample is found by evaporation of the solvent to be 10.0% wt. An $^1$H NMR analysis of this sample, B1-B2, shows that the average vinyl content is 44.6% wt. This is the weighted average of the vinyl contents for the two polymer segments, B1 and B2. The vinyl content of segment B2 is calculated using the following method:

i. From the solids analyses for Step I and Step II and the weight of the contents of the reactor at the end of each of these steps, it is deduced that 48.1% wt of the Step II polymer is from B1 and 51.9% wt of the product is from the B2 segment. Then, ii. Average Vinyl Step II=(Vinyl B1×0.481)+(Vinyl B2×0.519)

iii. Vinyl B2=((Average Vinyl Step II)−(Vinyl B1×0.481))/0.519=79.1% wt.

iv. Segment B2 of the block polymer had a vinyl content of 79.1% wt.

The living polymer cement from Step II of the polymerization is treated with 4.56 g of a 25% wt solution of TEA (10 mmol) in cyclohexane, a microstructure control agent deactivant. About 100 g of butadiene is charged to the reactor and the ensuing polymerization results in segment B3.

When the third step of the polymerization is complete after about 60 minutes, a small aliquot of the polymer cement is removed from the reactor and terminated by the addition of methanol. The concentration of polymer in the Step III cement is found by evaporation of the solvent to be 13.8% wt. An $^1$H NMR analysis of this sample, B1-B2-B3, shows the average vinyl content to be 52.3% wt. This is the weighted average of the vinyl contents from Step II (B1-B2) and Step III (B3). The vinyl content of segment B2 is calculated using the following method:

i. From the solids analyses for Step II and Step III and the weight of the contents of the reactor at the end of each of these steps, it is deduced that 68.7% wt of the Step III polymer is from B1–B2 and 31.3% wt of the product is from the B3 segment. Then, ii. Average Vinyl Step III=(Vinyl B1–B2×0.687)+(Vinyl B3×0.313)

iii. Vinyl B3=((Average Vinyl Step III)–(Vinyl B1–B2× 0.687))/0.313=69.2% wt.

iv. Segment B3 of the block polymer had a vinyl content of 69.2% wt.

As expected, the polymerization of segment B1 with no microstructure modifier produces a polybutadiene with a very low vinyl content, 7.4%. The second block of polybutadiene is added in the presence of a microstructure modifier, DEP, and, as expected, results in a segment, B2, that has a very high vinyl content, 79.1%. The third block of polybutadiene, segment B3, is made after TEA has been charged to the reactor. Surprisingly, this segment has a lower vinyl content, 69.2%, than did segment B2. Clearly, the added TEA deactivates the microstructure modifier, DEP, which had been added in Step II. In the preparation of triblock copolymer B1-B2-B3, TEA acts as an effective microstructure control agent deactivant.

What is claimed is:

1. A process for preparing a conjugated diene polymer or copolymer block having a varying amount of branching comprising combining:
   (a) an anionic polymerization site;
   (b) a conjugated diene monomer; and
   (c) a microstructure control agent;
under reaction conditions sufficient to form a living polymer admixture and, at a point in the process prior to the completion of the polymerization of the conjugated diene monomer, combining the living polymer admixture with a microstructure control agent deactivant to mitigate or eliminate the effect of the microstructure control agent, wherein the microstructure control agent deactivant is an aluminum alkyl compound having from 1 to 20 carbon atoms per alkyl substituent and mixtures thereof.

2. The process of claim 1 wherein the conjugated diene monomer is selected from the group consisting of 1,3-butadiene, isoprene, piperylene, methylpentadiene, 1,3-cyclohexadiene, 1,3-cylcohepatdiene, 1,3-cyclooctadiene phenylbutadiene, 3,4-dimethyl-1,3-hexadiene, 4,5-diethyl-1,3-octadiene, and mixtures thereof.

3. The process of claim 2 wherein the conjugated diene monomer is 1,3-butadiene.

4. The process of claim 1 wherein the process is a process for preparing a conjugated diene copolymer block and the anionic polymerization site is a living polymer.

5. The process of claim 4 additionally comprising a step of preparing the anionic polymerization site by admixing a monomer different from the conjugated diene monomer with an initiator.

6. The process of claim 5 wherein the monomer different from the conjugated diene monomer is styrene.

7. The process of claim 1 wherein the microstructure control agent is a Lewis Base.

8. The process of claim 7 wherein the Lewis Base is selected from the group consisting of:

diethyl ether;
1,2-diethoxy-ethane;
1,2-diethoxy-propane;
o-dimethoxy-benzene;
1-t-butoxy-2-n-butoxy-ethane;
n-$C_4H_9OCH_2CH_2$O-n-$C_4H_9$;
n-$C_4H_9OCH_2CH_2OCH_2OCH_3$;
n-$C4H_9OCH_2CH_2OCHCH_3OCH_2CH_3$;
n-$C_4H_9OCH_2CH_2$O-t-$C_4H_9$;
n-$C_4H_9OCH_2CH_2OCHCH_3$—O-i-$C_4H_9$; and
mixtures thereof.

9. The process of claim 1 wherein the aluminum, alkyl having from 1 to 20 carbon atoms per alkyl substituent is selected from the group consisting of:

triethylaluminum,
trimethylaluminum,
tri-n-propylaluminum,
tri-n-butylaluminum,
triisobutylaluminum,
tri-n-hexylaluminum,
trioctylaluminum, and
mixtures thereof.

10. The process of claim 9 wherein the microstructure control agent deactivant is triethylaluminum.

11. The process of claim 1 wherein the microstructure control agent deactivant is added to the living polymer at a ratio of microstructure control agent deactivant to microstructure control agent of from about 0.1:1 to about 2:1.

12. The process of claim 11 wherein the microstructure control agent deactivant is added to the living polymer at a ratio of microstructure control agent deactivant to microstructure control agent of from about 0.5:1 to about 1.1:1.

13. The process of claim 12 wherein the microstructure control agent deactivant is added to the living polymer at a ratio of microstructure control agent deactivant to microstructure control agent of about 1:1.

14. The process of claim 1 wherein the microstructure control agent deactivant is added at a point in the process where from about 25 percent to about 75 percent of the conjugated diene monomer has been polymerized and incorporated into the living polymer.

15. The process of claim 14 wherein the microstructure control agent deactivant is added at a point in the process where about 50 percent of the conjugated diene monomer has been added and incorporated into the living polymer.

16. The process of claim 6 further comprising using a coupling agent to form a coupled block copolymer.

* * * * *